May 27, 1930.    H. M. MARTENSON ET AL    1,760,158
GRAVEL LOADING DEVICE
Filed July 16, 1926    2 Sheets-Sheet 2
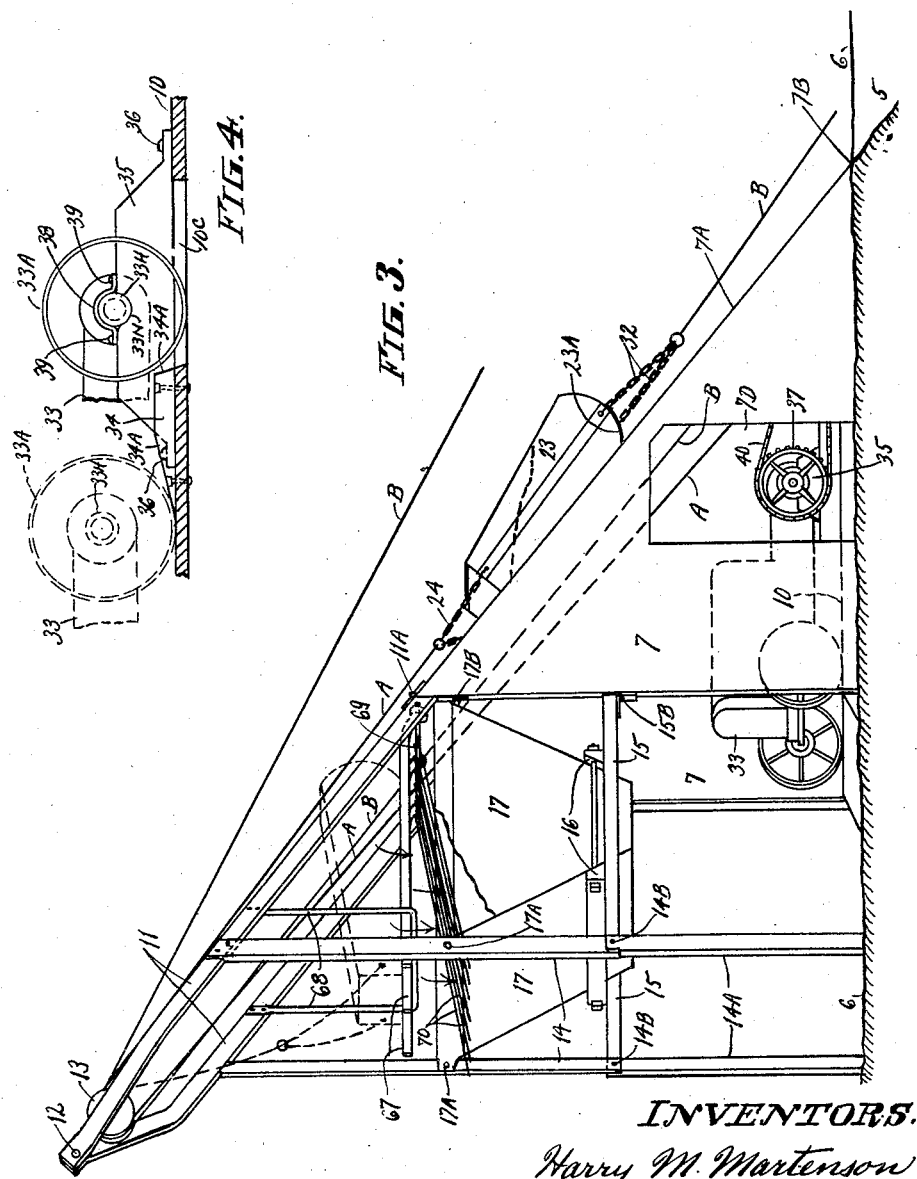
INVENTORS:
Harry M. Martenson
Fred W. Peterson
BY David E. Carlsen
ATTORNEY.

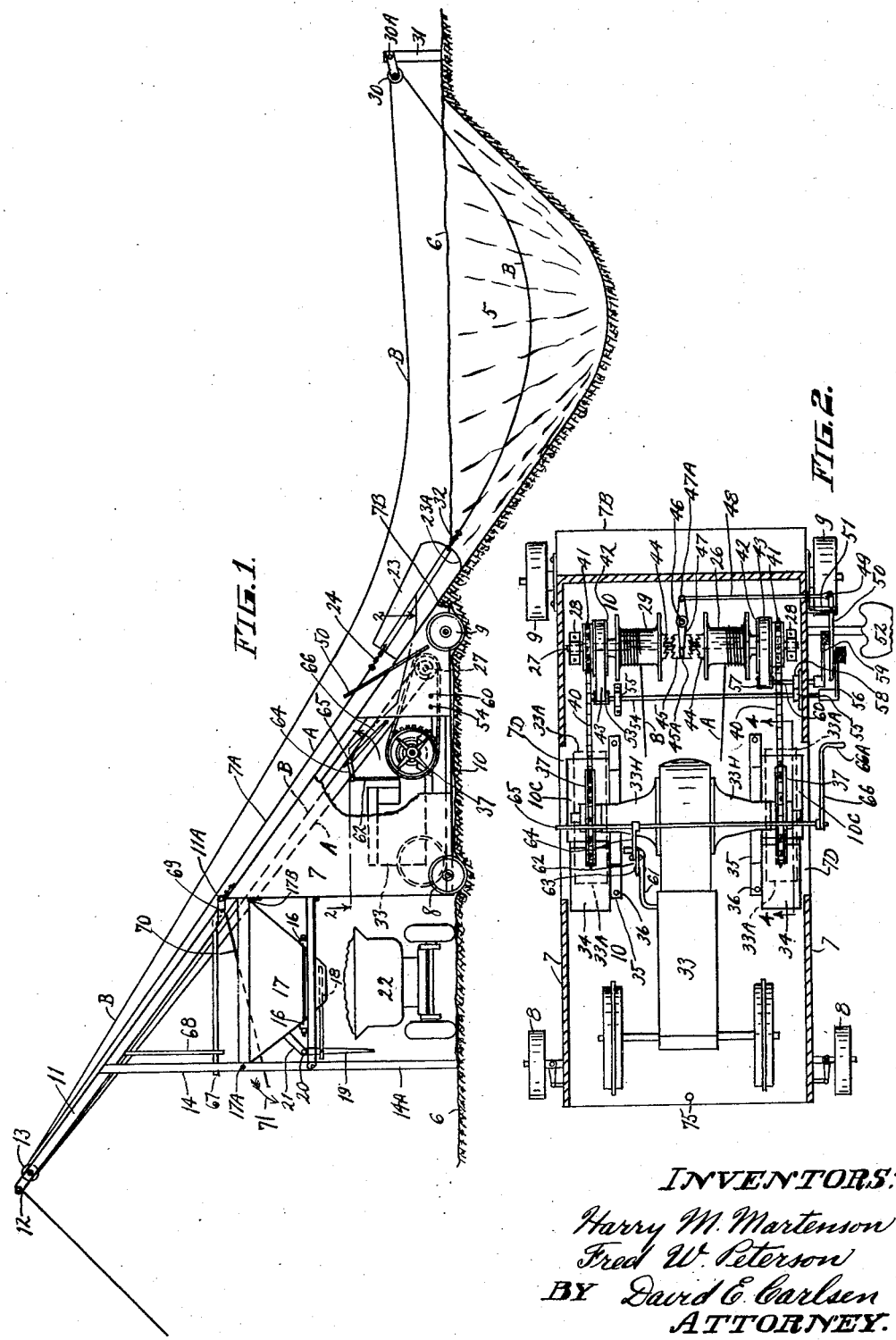

Patented May 27, 1930

1,760,158

UNITED STATES PATENT OFFICE

HARRY M. MARTENSON AND FRED W. PETERSON, OF WHITE ROCK, MINNESOTA

GRAVEL-LOADING DEVICE

Application filed July 16, 1926. Serial No. 122,804.

Our invention relates to gravel loading devices and the object is to provide a small gravel handling device which is portable and operable by one man, the construction of the device being such that the power plant used for hoisting and dumping gravel is removable from the device and readily made available for towing the other parts of the device from one gravel pit to another.

Other objects will be further revealed in the following specification, reference being had to the accompanying drawings, in which:—Fig. 1 is a side elevation of our device in operative position at the edge of a gravel pit.

Fig. 2 is an enlarged sectional view about as on line 2—2 in Fig. 1 showing a floor plan of the housing and including the cable handling means and a tractor operatively connected with the latter.

Fig. 3 is a perspective view of the entire device, showing certain details more clearly and omitting a number of minor details found in Figs. 1 and 2.

Fig. 4 is an enlarged partly diagrammatic sectional view about as on line 4—4 in Fig. 2 showing mainly the method of placing a tractor in the position it occupies when used as the power plant of the device.

Referring to the drawings by reference numerals 5 designates a gravel pit and 6 the ground level about the pit. 7 is the main frame or mechanism housing of our device mounted on front wheels 8 and rear wheels 9. This housing unit is of triangular form, the roof or top comprising a planked slope 7A extending from the top of the front wall downwardly to a point rearward of the rear wheels where it terminates at 7B approximately on a level with the floor 10. The floor may rest directly on the ground, as in Fig. 3, by simply digging hollows as 6A (Fig. 1) for the wheels 8 and 9 to be sunk into, the device then being rigidly set so that the rear slope edge 7B is at the edge of the gravel pit.

Adjoining the front wall of the housing unit we provide an auxiliary open frame consisting of an open inverted U-shape frame 11 normally in the plane of the slope 7A and hinged to the upper extremity of the latter as at 11A said U-frame comprising two parallel members joined at their upper ends by a bolt 12 or the like and from which is suspended a sheave block having two sheaves 13. 14 are legs supporting the upper portion of frame 11 and spaced some distance forward of housing 7. The lower parts of these legs, as 14A, may be hinged as at 14B and 15 are two horizontal frame bars connected one each at 14B and also at 15B to the front part of housing 7. 16 is a pair of transverse, horizontally spaced bars fixed on bars 15 and adapted to support the lower part of a downwardly tapered gravel hopper 17 which is thus supported within the auxiliary frame in elevated position, the said hopper being also preferably detachably securable at its upper part, at 17A, to the uprights 14 and hingedly securable to housing 7 as at 17B. 18 represents any suitable form of slide valve in the lower part of hopper 17 (see Fig. 1) said valve having an external stem 18A pivotally connected to a lever 19 fulcrumed at 20 to a fixed arm 21, the said lever 19 being accessible to the driver of any vehicle 22 driven under the hopper to be loaded with gravel (see Fig. 1).

With our main housing and auxiliary frame set for operation at the edge of a gravel pit as above described and shown in Figs. 1 and 3 we provide a so-called scraper type of bucket 23 which is open forwardly and downwardly and has a forwardly curved rear end (as 23A in Figs. 1 and 3). The forward end of the bucket is connected by a chain 24 to a cable A, passed upwardly over one sheave 13 thence downwardly and rearwardly within frame 11 into housing 7 and wound on a cable drum 26 rotatably mounted on a drum shaft or countershaft 27 mounted in bearings 28 fixed on floor 10 in the rear part of housing 7. This shaft 27 also carries another drum 29 on which is wound one end of a cable B extending from said drum 29 to the other sheave 13 thence extended over the roof or slope 7A to a sheave 30 suitably fixed as at 30A to a post 31, or the like, fixed at the far side of the gravel pit and from thence the cable extends downwardly into the pit and is connected to a chain 32 or like means on the rear end of the bucket 23 (see Figs. 1 and 3).

The power plant of our gravel pit device comprises simply a tractor 33 which is backed into the open front of housing 7 on floor 10. 34 are two transversely spaced blocks suitably secured on floor 10 each having rearwardly and upwardly inclined face 34A (Fig. 4) on which surfaces the traction (rear) wheels 33A ascend and then move rearwardly to the ends of the blocks (as 34A Fig. 4) at the front edge of an opening 10C in floor 10. The said wheels 33A will of course drop into the opening 10C causing the tractor axle housings 33H to simultaneously descend into notches 35N of two parallel and transversely spaced blocks 35 fixed at 36 to floor 10. The traction wheels 33A are then in suspension and readily removed to be replaced by chain-drive gears 37. 7D are openings in the side walls of housing 7 through which the tractor drive wheels may be removed. 38 is an arched clamping member, or yoke, adapted to straddle the axle housing 33H and clamp it securely by means of bolts 39 to each block 35 (see Fig. 4). The drive gears 37 each drive a chain 40 extended rearwardly and engaging a chain-drive sprocket 41 keyed on the countershaft 27. Between each said sprocket 41 and its adjacent cable drum we provide a brake drum 42, fixed to the cable drum, and engaged by a contraction brake band 43. Each cable drum in loose on the countershaft 27. The adjacent ends of the cable drums are provided with clutch jaws 44 (see Fig. 2) either of which may be engaged by a similarly jawed clutch member 45 slidably keyed on shaft 27 and thus movable into engagement with either cable drum or into neutral position (as in Fig. 2) by means of a clutch lever 47 fulcrumed on a pin 46 fixed near the clutch. One end of lever 47 engages a central groove 45A in the clutch member and the other end is pivotally secured at 47A to a horizontal, transversely arranged rod 48 extending outside of the housing 7 where it is connected at 49 to the lower end of a hand operated lever 50 fulcrumed in a bracket 51, said lever being accessible to an operator on a seat 52 fixed to the outer wall of housing 7 near one of its rear wheels 9 (see Fig. 2).

53 is a suitable cam fixed to the ends of the right hand brake band 43 and keyed on a rock shaft 54 journaled in bearings 55 and extending through the side wall 7 the outer end of said shaft carrying a foot lever 56 accessible to the operator. 57 is a like cam on a shaft 60 and engaging the ends of the left hand brake band 42, said shaft 60 journaled in a bearing 58 and carrying a foot lever 59 externally of wall 7. 61 is the clutch foot lever of the tractor. In our device we use an upright reach rod 62 the lower end of which is pivotally connected at 63 to said clutch lever and its upper end pivoted at the free end of a lever 64 keyed on a horizontal shaft 65 suitably journaled transversely within the housing 7 and extending outwardly from the left wall thereof, and on the latter end of the shaft is secured a hand lever 66 with a hand hold 66A within reach of the operator.

Above the hopper 17 we provide a horizontal grating 67 comprising a series of parallel bars the front ends of which rest on a U-shaped hanger 68 fixed to bars 11 and the rear ends of said grate bars preferably fixed on a horizontal cross bar 69 fixed transversely in the lower part of frame 11. It will be readily understood that when a scraper-bucket 23 full of gravel is moved up the slope by cable A the bucket is drawn between the bars 11, the cable A is allowed to become slack and the bucket drops onto the grate 67 (as shown dotted in Fig. 3) its contents falling through the grate into the hopper 17. 70 is a series of parallel rods below grate 67 and arranged in forwardly and downwardly directed common plane, the forward ends of said rods resting on the upper outer edge of the hopper and the rear ends preferably fulcrumed on rod 69. These rods 70 thus form a practical screen through which the gravel readily drops into the hopper but stones of too large size will roll down the inclined slope and drop onto the ground as indicated by arrow 71 in Fig. 1.

In the use of our device it may be assumed that the device is "set" for operation as in Fig. 1, at the edge of a gravel pit, also assuming that the tractor engine is running and through its clutch running the rear axle and the chain gears 37, chains 40 and the countershaft sprockets 41 and shaft 27. Cable A is extended from under the drum 26 and cable B likewise from drum 29 (Fig. 2). The gravel bucket 23 should of course start its loading at the bottom of the pit and be pulled upwardly along the natural slope of gravel, accumulating gravel within it as it ascends. This requires an upward pull of cable A between the bucket and the sheave 13, which is accomplished by the operator engaging the jaw clutch 45 with drum 26, the clutch 45 immediately causing said drum to rotate in a direction to wind cable A upon the drum by pulling downwardly and rearwardly on the lower bight of cable A. The bucket is thus drawn upwardly until it gets over the upper grate 67 when the clutch 45 is released, allowing cable A to slacken and the gravel is dumped on the grate. Meanwhile cable B is correspondingly unwound from drum 29, the cable riding idly over its sheave 13 rearwardly to sheave 30 and its bucket end trailing the bucket in its upward movement. In returning the bucket to the pit the operator engages clutch 45 with drum 29 causing the power to be applied to rotate said drum and wind cable B upon it. Following this rearward pull of cable B at drum 29 it will be seen that its upper or aerial bight is drawn forward and the rear, lower bight over the pit is drawn rearward thus pulling the bucket back into or over the pit as desired. The cable B may of course be taughtened more or less by causing resistance in cable A which is simultaneously being unwound, said resistance being accomplished by the operator applying the brakes as required. Thus the bucket may be brought over the gravel pit in suspended position and permitted to drop to the bottom and thus get a better "bite" in the gravel before it is started on its upward course.

We prefer to make the auxiliary frame or hopper frame in such a manner that its props 14A may be folded up under bars 15, or disconnected at 14B from legs 14. The members 15 may be hinged at 15B allowing the parts 14A and 15 to be folded together and allowed to hang from 15B. The hopper may also be disconnected at 17A and allowed to hang down in the front opening of the housing 7, after the tractor has been removed from within. Then the upper parts of the auxiliary frame, including parts 11, 14, 67, 68 and 70 may be swung rearwardly as a unit on hinges 11A and laid on the slope 7A. Other collapsible features may be incorporated without departing from the scope and spirit of the invention. Then the tractor, which has its driving wheels restored, can be used to transport the entire device by attaching the tractor draw-bar (not shown) as with a draw-pin or other suitable means inserted in an aperture 75 in the front central part of the floor 10 of housing 7.

It is obvious that our device is operable by one man seated at 52 near the edge of the gravel pit and has all its manipulating levers within the operator's reach. This one-man operation, the portable features of our device and the double use of a tractor serving as a power plant and as a towing device can readily be seen to be highly important features from both an economical and practical point of view.

We claim:

In a portable gravel handling device of the class described, a housing with an inclined top extending approximately to the ground level, a skeletoned extension frame normally in common plane with and from the top of said sloping top and having adjustable supports and a hopper under the said extension frame, two cables, cable handling means mounted within said housing, a gravel bucket adapted to be drawn by one of said cables from a point rearward of said housing and up the sloping top thereof and onto said grate, the other cable connected to said bucket and adapted to draw it rearwardly from the grate; a source of power within said housing including cable drums operatively connected with said cables, and power control means operatively connected with said source of power and the cable operating means, a floor in said housing, said housing open forwardly to receive a tractor adapted to be backed therein on said floor, means holding the axle housings of the tractor in fixed position on said floor, and means operatively connecting said tractor with the cable drums substantially as shown and described.

In testimony whereof we affix our signatures.

HARRY M. MARTENSON.
FRED W. PETERSON.